(12) United States Patent
Walton et al.

(10) Patent No.: US 6,237,735 B1
(45) Date of Patent: May 29, 2001

(54) VISCOUS ACTUATED BALL RAMP CLUTCH HAVING ONE-WAY CLUTCH

(75) Inventors: Erlen B. Walton, Famington Hills; David M. Preston, Clarkston, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/206,579

(22) Filed: Dec. 7, 1998

Related U.S. Application Data

(63) Continuation-in-part of application No. 09/109,354, filed on Jul. 2, 1998, which is a continuation-in-part of application No. 08/865,901, filed on May 30, 1997, now abandoned.

(51) Int. Cl.[7] ................................................. F16H 48/12
(52) U.S. Cl. .................... 192/35; 192/48.92; 192/104 C; 74/650
(58) Field of Search .......................... 192/35, 48.6, 48.4, 192/57, 48.92, 104 C, 54.52; 180/248, 249; 74/650

(56) References Cited

U.S. PATENT DOCUMENTS

| | | | |
|---|---|---|---|
| 5,036,963 | * 8/1991 | Murata | 192/35 |
| 5,070,975 | 12/1991 | Tanaka et al. | 192/35 |
| 5,529,158 | * 6/1996 | Itoh et al. | 192/35 |
| 5,542,514 | * 8/1996 | Itoh et al. | 192/48.6 X |

FOREIGN PATENT DOCUMENTS 0 314 420   5/1989   (EP).

* cited by examiner

*Primary Examiner*—Rodney H. Bonck
(74) *Attorney, Agent, or Firm*—L. J. Kasper

(57) ABSTRACT

A center differential (17) including a clutch pack (33), a cam ramp actuator (31) for moving the friction discs (65,67) toward an engaged position, and a viscous coupling (29) which will have a "slip speed" representative of the speed difference between the front (11) and rear (23) wheels. There is a one-way clutch (57) disposed between the output (49) of the viscous coupling (29) and the first ramp plate (51) to transmit positive torque when the vehicle is in a forward gear, but negative torque is not transmitted, for example, during braking. An override mechanism (55) is provided, including a plurality of spring biased pins (107), such that, below a predetermined speed of rotation, positive torque can also be transmitted when the vehicle is in reverse gear. The pins (107) are associated with flyweight members (97) so that, above the predetermined speed, the pins are disengaged, and positive torque can be transmitted only in forward gear.

8 Claims, 4 Drawing Sheets

VISCOUS ACTUATED BALL RAMP CLUTCH HAVING ONE-WAY CLUTCH

CROSS-REFERENCE TO RELATED APPLICATION

This application is a continuation-in-part (CIP) of co-pending application U.S. Ser. No. 109,354, filed Jul. 2, 1998 in the name of Erlen B. Walton for a "VISCOUS ACTUATED BALL RAMP CLUTCH", which is a continuation-in-part (CIP) of copending application U.S. Ser. No. 865,901, filed May 30, 1997, in the name of Erlen B. Walton for a "VISCOUS ACTUATED BALL RAMP CLUTCH".

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a driveline system for a four wheel drive vehicle, and more particularly, to a differential device for use in such a driveline system. The use of the term "differential" does not imply the presence of conventional differential gearing, but instead, the term is used primarily because the device of the present invention replaces the typical prior art center differential. However, it should be understood that the device illustrated, described and claimed herein has uses other than as a center differential.

In many of the vehicles being produced today, the basic vehicle platform is a front wheel drive. However, in many such vehicles, especially in vans and sport utility vehicles, it is considered desirable to be able to provide four wheel drive, at least under certain operating conditions.

Typically, the various arrangements for achieving part-time four wheel drive have been complex and expensive, and in some cases, have required some sort of control scheme to achieve the four wheel drive (or rear wheel drive) in response to certain predetermined operating conditions.

It is known from U.S. Pat. No. 5,070,975 and from European Application EP 0 314 420 to use, as a center differential in a four wheel drive type of driveline, a viscous actuated ball ramp type friction clutch to transmit torque to the rear axles when there is a speed difference between the front and rear wheels. It is believed that the torque transmitting capability of the device of the cited patent and application would be somewhat limited by the fact that one of the ball ramp plates comprises the input to the viscous coupling. Despite such shortcomings, the device of the cited patents and application would be at least generally functional when transmitting a "positive" torque, i.e., whenever the vehicle is moving in a forward direction, and torque is being transmitted from the input, through the center differential into the output.

However, in most vehicle applications, it is necessary for the center differential device to be able to deal with "negative" torques, i.e., situations in which, with the vehicle still moving forward, torque is transmitted from the rear axles to the front axles. For example, because such vehicles typically have more weight on the front wheels than on the rear wheels, more braking effort is expended at the front wheels than at the rear wheels. Therefore, during a braking operation, using merely a standard center differential, negative torque would be transmitted, through the differential, from the rear axles to the front axles. Under some operating conditions, the transmission of negative torque as described above would not pose any particular problem. However, whenever the vehicle is in a gradual turn, such as on a ramp leading to or from a freeway, and on a low coefficient-of-friction surface, the occurrence of a negative torque is likely to result in loss of traction at the rear wheels, thus making the vehicle unstable, and the rear wheels likely to spin out.

In order to prevent the transmission of negative torque through the center differential, while the vehicle is moving in a forward direction, it is known to utilize some form of one-way clutch in the driveline. Although the provision of a one-way clutch in the driveline solves the negative torque problem by preventing the transmission of a negative torque from the rear wheels to the front wheels when the vehicle is moving forward, the presence of the one-way clutch prevents the transmission of a positive torque, from the input (front wheels) of the differential to the output (rear wheels), when the vehicle is operating in reverse. In other words, although it would be possible for the vehicle to move in a reverse direction, i.e., to "backup", if the vehicle is of the four wheel drive type, the vehicle would have to rely on the drive torque of the front wheels to do so.

In order to provide drive to the rear wheels, it is known in the vehicle driveline art to provide some means to defeat or bypass the one-way clutch. For example, it is known to engage a jaw clutch whenever the vehicle is shifted into reverse, wherein the jaw clutch is in parallel with the one-way clutch, and effectively bypasses the one-way clutch, such that the driveline transmits positive torque through the jaw clutch when the vehicle is in reverse gear.

In one known system, which is in commercial use, there is provided, between the center differential and the rear axles, an assembly comprising a one-way clutch and a speed sensing, flyweight actuated, sliding clutch, comprising a path in parallel with the one-way clutch. The cited prior art system, being in the driveline downstream of the center differential, must transmit substantially all of the driveline torque, and therefore, must be constructed in a manner that adds substantially to the overall weight and cost of the driveline system.

BRIEF SUMMARY OF THE INVENTION

Accordingly, it is an object of the present invention to provide an improved differential device for use in a driveline of a vehicle which enables the driveline system to overcome the above disadvantages of the prior art driveline systems.

It is a more specific object of the present invention to provide an improved center differential device for use in a four-wheel drive driveline system wherein the center differential includes a one-way clutch to prevent the transmission of negative torque, but without adding substantial weight and cost to the driveline system.

It is a more specific object of the present invention to provide an improved center differential which accomplishes the above-stated objects, in which the differential includes a means to bypass or override the one-way clutch.

It is an even more specific object of the present invention to provide an improved center differential which accomplishes the above-stated objects, wherein the one-way clutch and the mechanism for overriding the one-way clutch are required to transmit only a relatively small portion of the entire driveline torque.

The above and other objects of the invention are accomplished by the provision of an improved differential device of the type including an input adapted to receive input torque from a source of torque, an output adapted to provide driving torque to an output device and a clutch pack including at least a first friction disk fixed to rotate with the input and at least a second friction disk fixed to rotate with the output. The device includes means operable to move the friction disks between a disengaged position and an engaged position, and comprises a cam ramp actuator including first and second ramp plates, and a plurality of cam members, each operably disposed between the first and second ramp plates. The second ramp plate is disposed axially adjacent the friction disks and is operable to move the friction disks toward the engaged position. The means operable to move the friction disks further comprises a viscous coupling including an input coupling member fixed to rotate with the input, and an output coupling assembly.

The improved differential device is characterized by one-way clutch means disposed in series between the output coupling assembly and the first ramp plate. The one-way clutch means is configured such that positive torque is transmitted from the input through the viscous coupling, through the one-way clutch means to the first ramp plate during operation in a forward direction, whereas negative torques are not transmitted through the one-way clutch means during operation in the forward direction.

In accordance with another aspect of the invention, the improved differential device is characterized by the device further comprising an override mechanism operably associated with the output coupling assembly and the first ramp plate. The override mechanism is configured such that positive torque is transmitted from the input to the first ramp plate during operation in a reverse direction below a predetermined speed of rotation.

DETAILED DESCRIPTION OF THE PREFERRED EMBODIMENT

Figure 1:
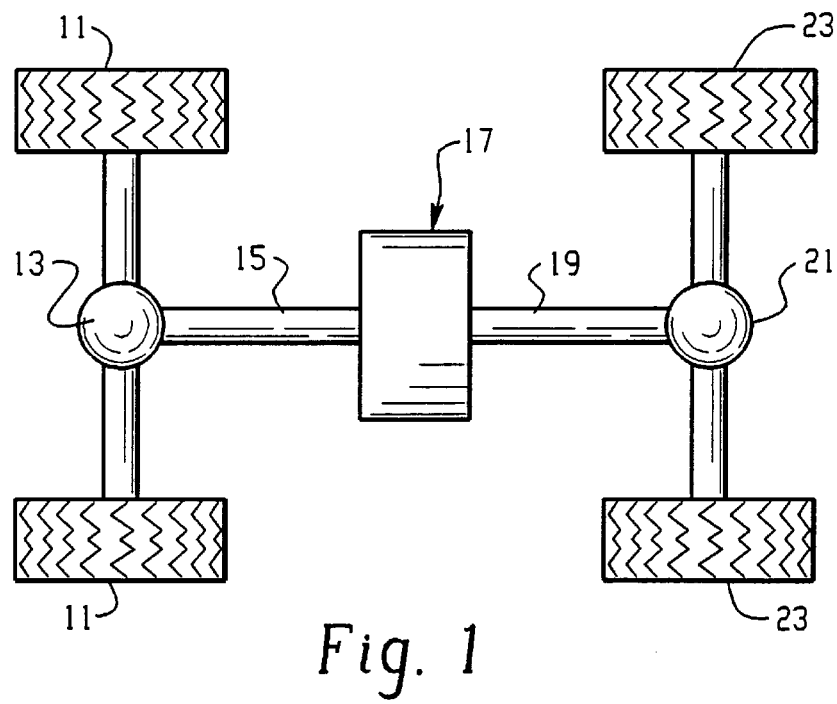
FIG. 1 is a schematic of a driveline system of the type in which the present invention may be utilized.

Referring now to the drawings, which are not intended to limit the invention, FIG. 1 illustrates a schematic of a driveline system for a four wheel drive vehicle, of the type with which the present invention may be utilized. The driveline system of FIG. 1 includes a pair of front drive wheels 11, driven by a front transaxle 13. Extending rearwardly out of the transaxle 13 is an input shaft 15, which typically receives input torque, by means of a right angle gear set (not shown in FIG. 1) in the transaxle 13, such that the speed of rotation of the input shaft 15 is representative of the speed of rotation of the front drive wheels 11.

The input shaft 15 is associated with a center differential device, generally designated 17, which includes an output shaft 19, by means of which torque may be transmitted to a rear differential 21, and then to a pair of rear drive wheels 23. Typically, the device 17 could be reversed, i.e., the shaft 19 could be the input and the shaft 15 could be the output, and therefore, the use herein of the terms "input" and "output" will be understood as explanatory and not limiting, unless otherwise specifically noted. As was mentioned previously, it will be understood by those skilled in the art that the term "center differential device" does not mean or imply that the device include a conventional differential gear set, but instead, the term will be understood in its broader sense to mean that the device 17 will permit differentiating action between the input shaft 15 and the output shaft 19. In the subject embodiment, the front drive wheels 11 are the primary drive wheels, and the rear drive wheels 23 are only secondary drive wheels. However, within the scope of the present invention, such could be reversed, i.e., the rear wheels being the primary drive wheels and the front wheels being the secondary drive wheels.

Although the present invention will be described as though the front wheels 11 and the rear wheels 23 normally rotate at the same speed, as the vehicle is travelling straight ahead, those skilled in the art will understand that such is typically not the case. For various reasons, such as the fact that the front wheels normally have a smaller rolling radius, the front drive wheels 11 typically rotate somewhat faster than the rear wheels 23. Therefore, in a typical driveline system of the type shown in FIG. 1, there is almost always at least some torque being transmitted by the center differential device 17. As a result, the performance requirements for the device 17 are much more stringent than would be the case if the device merely rotated as a "solid" unit for most of its duty cycle.

Figure 2:
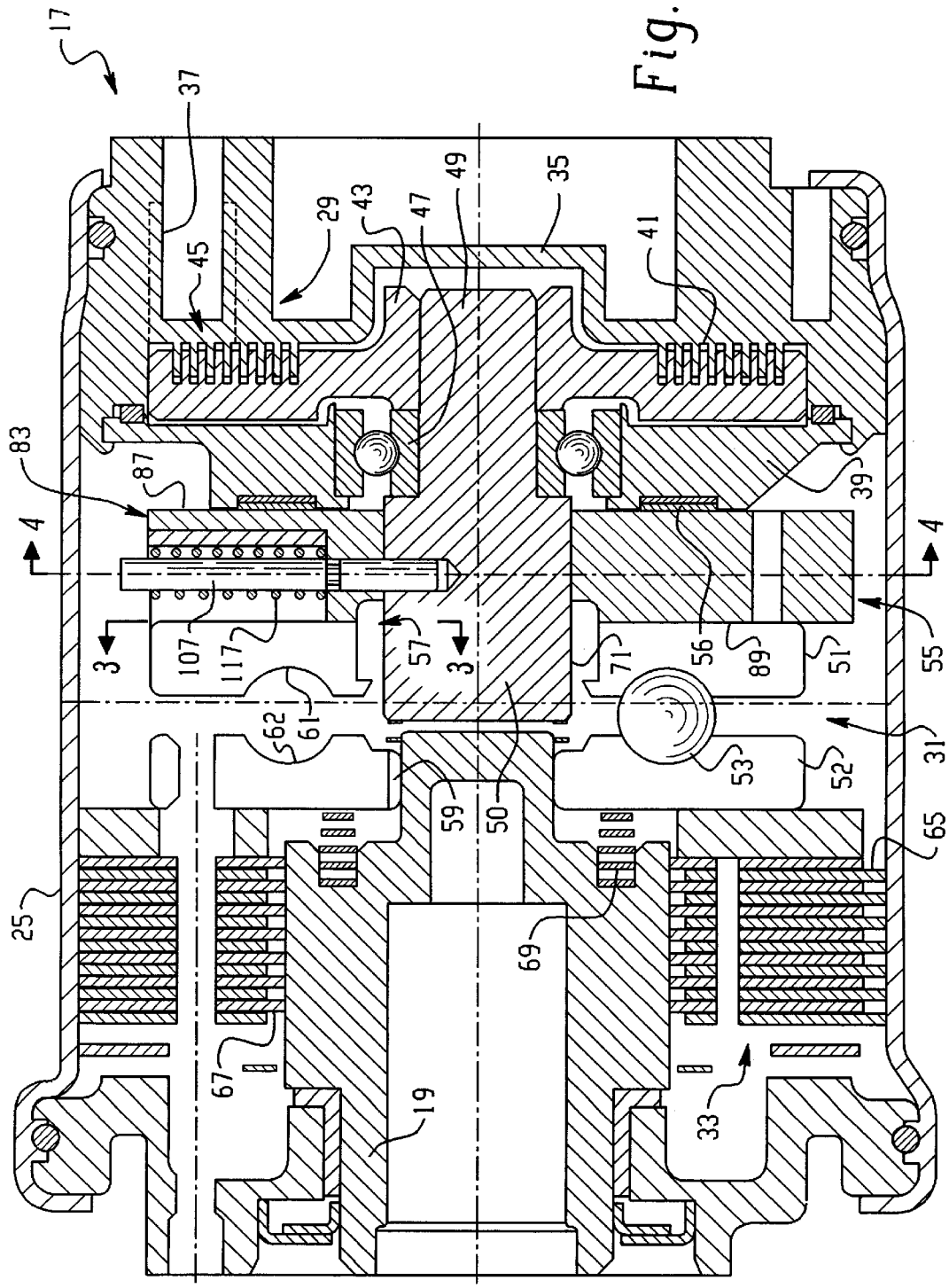
FIG. 2 is an axial cross-section of the differential device of the present invention.

Referring now primarily to FIG. 2, which is reversed from the orientation in FIG. 1, the center differential device 17 will be described in some detail. The device 17 includes a housing 25, and disposed within the housing 25, the center differential device 17 may be viewed as comprising three separate portions as follows: a viscous coupling 29; a ball ramp actuator 31; and a clutch pack 33. It is one important feature that these portions comprise separate, somewhat functionally independent devices, as will become apparent from the subsequent description.

The viscous coupling 29 includes an input coupling member 35, which is fixed to the housing 25, in a manner to be described subsequently. The input coupling member 35 preferably defines a plurality of threaded bores 37, by means of which the input shaft 15 can be bolted to the input of the differential device 17. The viscous coupling 29 also includes a housing (body) 39, such that the member 35 and the housing 39 cooperate to comprise a totally functional, self-contained viscous coupling output assembly, which defines therein a viscous shear chamber 41. Preferably, the member 35 and housing 39 are assembled by means of a rollover of a portion of the member 35 about the outer periphery of the housing 39, in a manner well known to those skilled in the art. In accordance with another aspect of the invention, it is very possible that no rotating seals (other than those which may be required in bearing sets) are required to separate the viscous fluid in the chamber 41 from the oil in the rest of the device 17, and because the viscous chamber 41 is permanently sealed, the torque versus slip speed of the coupling 29 will be constant and predictable.

Disposed within the viscous shear chamber 41 is an output coupling member 43, and in a manner well known to those skilled in the art of viscous couplings, the input coupling member 35 and the output coupling member 43 define a plurality of interdigitated lands and grooves, generally designated 45. With viscous fluid (typically, a silicone fluid) disposed in the lands and grooves 45, any relative rotation between the member 35 and the member 43 will result in a shear torque being transmitted to the member 43, the difference in speed between the members 35 and 43 typically being referred to as the "slip speed".

Disposed at the radially inner periphery of the housing 39 is a bearing set shown at 47, having its inner race disposed on a shaft portion 49, which is shown in FIG. 2 as having the output coupling member 43 pressed onto the shaft portion 49. The shaft portion 49 extends axially out of the viscous coupling 29 and includes a rearward portion 50 extending axially into the ball ramp actuator 31. The rest of the function of the shaft portion 49 will be described subsequently.

The ball ramp actuator 31 includes a first ramp plate 51, a second ramp plate 52, and a plurality of balls 53, although it should be understood that any form of cam member may be used. Disposed axially between the first ramp plate 51 and the housing 39 is an override mechanism, generally designated 55, to be described in greater detail subsequently. Disposed axially between the override mechanism 55 and the housing 39 is a bearing set 56, and although a device such as a bronze bushing could be used if handling the axial loading were the only concern, it is significant that the bearing 56 comprise a true "rolling" bearing, such as a needle type bearing.

Figure 3:
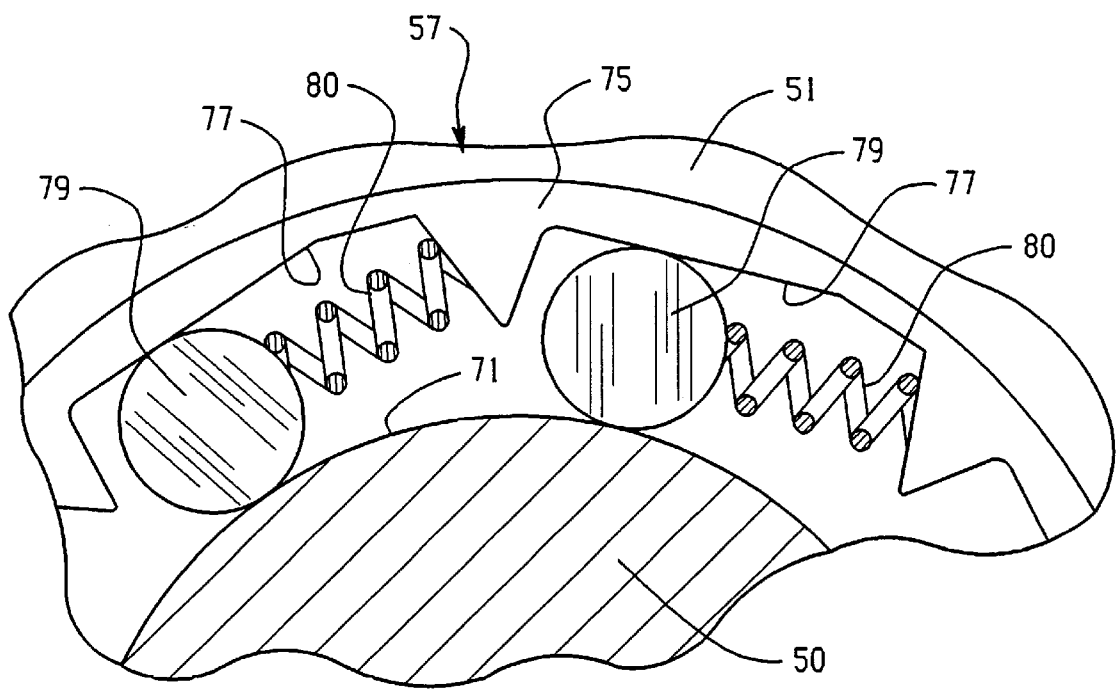
FIG. 3 is an enlarged, fragmentary transverse cross-section taken generally along line 3—3 of FIG. 2.

The rearward shaft portion 50 is preferably in driving engagement with the first ramp plate 51, by means of a one-way clutch, generally designated 57, as is shown in FIG. 3. Therefore, the output coupling member 43 of the viscous coupling 29 rotates at the same speed as the first ramp plate 51, by means of the shaft portion 49, when there is a "positive" torque, i.e., a torque which is being transmitted from the input shaft 15 to the output shaft 19, with the vehicle moving in a forward direction. The second ramp plate 52 is in splined engagement with the output shaft 19, by means of a set of splines 59, such that the second ramp plate 52 and the output shaft 19 rotate at the same speed. Alternatively, the forward end of the output shaft 19 could define a shape such as a hexagon, with the adjacent internal surfaces of the ramp plate 52 defining a mating shape.

In a manner well known to those skilled in the art, the first ramp plate 51 defines a plurality of first ramp surfaces 61, while the second ramp plate 52 defines a plurality of second ramp surfaces 62. In FIG. 2, the ball ramp actuator 31 is shown in its "neutral" position, i.e., each of the balls 53 is disposed in the "valley" of each of the ramp surfaces 61 and 62, such that the ramp plates 51 and 52 are at their minimum axial distance from each other, or stated another way, the overall axial dimension of the plates 51 and 52 is at a minimum. As is also well known to those skilled in the art, the neutral position of the ball ramp actuator 31 would correspond, typically, to a disengaged condition of the clutch pack 33. Preferably, the first and second ramp surfaces 61 and 62 include first and second detents (not illustrated herein), such that a very definite, predetermined speed difference (slip speed) within the viscous coupling 29 is required to initiate ramping of the ball ramp actuator 31, and such ramping will not occur in response merely to the very slight differences which may occur in response to variations in factors such as tire size, etc.

Disposed adjacent the second ramp plate 52 is the clutch pack 33, including a plurality of outer friction discs 65, and a plurality of inner friction discs 67. The outer discs 65 are in engagement with the housing 25, by any suitable means such as is illustrated and described in co-pending application U.S. Ser. No. 149,991, filed Sep. 9, 1998, in the names of Wayne B. Leichliter and Erlen B. Walton, for a "VISCOUS ACTUATED BALL RAMP CLUTCH AND IMPROVED HOUSING THEREFOR", assigned to the assignee of the present invention and incorporated herein by reference. The inner friction discs 67 are in splined engagement with a set of splines (not shown herein) defined on the outer cylindrical surface of the output shaft 19. Although flat friction discs are illustrated and described herein, it should be understood that the invention is not so limited, and various other friction devices could be used, such as cone-shaped members. Therefore, as used hereinafter, and in the appended claims, the term "disc" will be understood to mean and include all such suitable friction devices.

Although not an essential feature of the present invention, each of the friction discs 65 and 67 is provided with a suitable friction material, preferably a pyrolytic carbon friction material, made in accordance with the teachings of U.S. Pat. No. 4,700,823, assigned to the assignee of the present invention and incorporated herein by reference, or perhaps, another material suitable for the particular application and environment. It should be understood by those skilled in the art that, when the ball ramp actuator 31 is in its neutral position, and the clutch pack 33 is "disengaged", the friction discs 65 and 67 may be literally disengaged, in the sense of not even touching each other, but more likely, will be touching each other, and able to transmit some torque, but substantially less than the maximum torque which can be transmitted through the clutch pack 33.

Disposed in openings or recesses in the front (right end in FIG. 2) of the output shaft 19 is a plurality of spring assemblies 69, which, in the subject embodiment, comprise a pack of wave or leaf type springs. The forward ends of the spring assemblies 69 engage the second ramp plate 52, and the function of the spring assemblies 69 is to bias the second ramp plate 52 forwardly, tending to return the ball ramp actuator 31 toward its neutral position. As is generally known to those skilled in the ball ramp actuator art, the provision of the spring assemblies 69, biasing the actuator 31 toward neutral, will require a certain predetermined, minimum torque across the ball ramp actuator 31 before the ramp plates 51 and 52 will be rotationally displaced from the neutral position.

As may best be seen in FIG. 3, the one-way clutch 57 is disposed radially between the rearward end 50 of the viscous coupling output shaft portion 49 and the first ramp plate 51. It should be understood by those skilled in the art that the specific construction of the one-way clutch 57 is not an essential feature of the invention. In the subject embodiment, the one-way clutch 57 includes an inner race 71, which may merely comprise the outer surface of the rearward shaft portion 50, or may include a hardened race member. The one-way clutch includes an outer race 75 defining a plurality of driven pockets 77. Disposed in each driven pocket 77 is a drive member 79, illustrated herein as comprising a cylindrical, roller member. Each drive member 79 is biased by means of a compression spring 80. In the subject embodiment, and as viewed in FIG. 3, rotation of the shaft portion 50 in the counter-clockwise direction transmits a positive torque to the first ramp plate 51, whereas rotation of the shaft portion 50 in the clockwise direction (corresponding to reverse gear) transmits no torque to the first ramp plate 51.

Referring now primarily to FIGS. 4 through 7, the override mechanism will be described in some detail. The override mechanism 55 surrounds the rearward portion 50 of the shaft 49, with the rearward portion 50 defining three radial bores 81 (shown only in FIG. 4) with the three bores 81 being equally spaced, circumferentially. The override mechanism 55 includes a housing member 83 which would preferably comprise a powdered metal part. The housing member 83 defines a plurality of axial holes 85 by which the housing member 83 may be bolted to the first ramp plate 51 by a plurality of bolts or other fasteners, not shown herein. Thus, the override mechanism 55 is fixed to be non-rotatable relative to the first ramp plate 51, although such is not an essential feature of the present invention.

Figure 5:
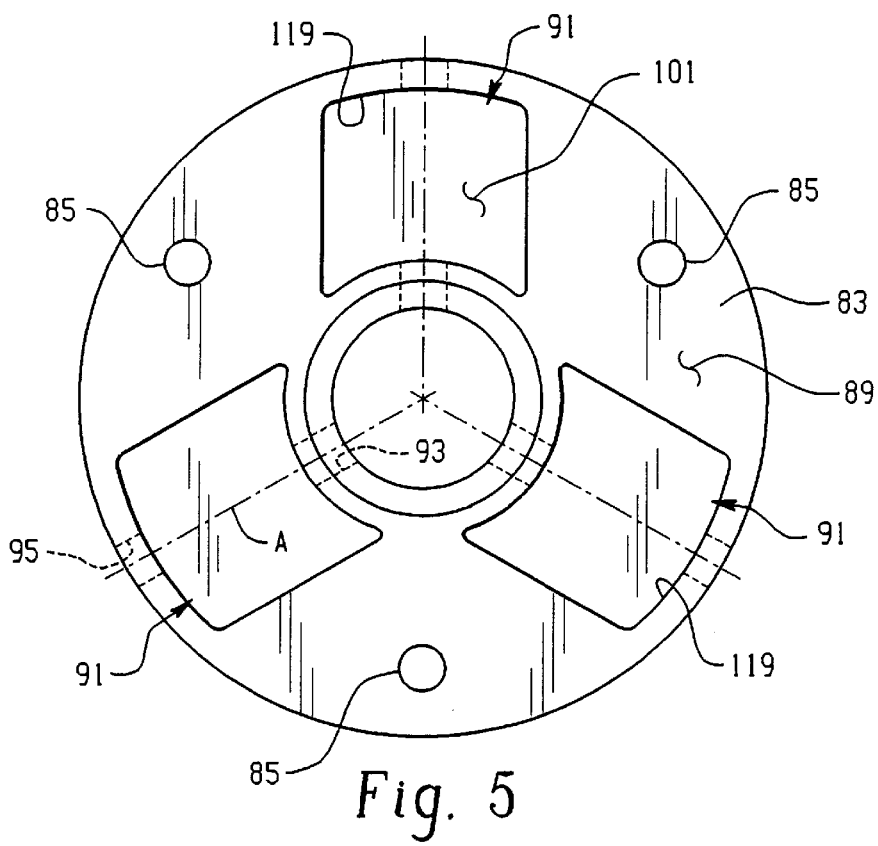
FIG. 5 is a view similar to FIG. 4, but illustrating only the housing member of the override mechanism.

The housing member 83 includes a forward surface 87 (shown only in FIG. 2) and a rearward surface 89 (shown in FIGS. 2 and 5). The rearward surface 89 defines three recesses 91, the three recesses 91 being uniformly spaced, circumferentially, in the same manner as the bores 81. Each recess 91 preferably has parallel sides, for reasons which will be apparent subsequently. Each recess 91 defines a central axis A (see FIG. 5) which is radially oriented. In association with each of the recesses 91, the housing member 83 defines a radially inner bore 93 and a radially outer bore 95. The bores 93 and 95 should be coaxial with the axis A for reasons which will become apparent subsequently.

Figure 6:
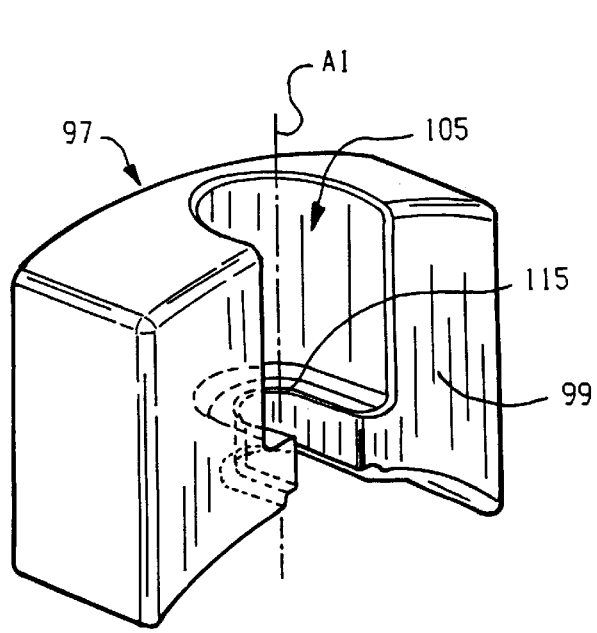
FIG. 6 is a perspective view of one of the flyweight members which comprises part of the override mechanism.

Disposed within each of the recesses 91 is a flyweight member 97, shown in perspective view in FIG. 6. Each flyweight member 97 includes a forward surface 99 (see FIG. 6) which is disposed in face-to-face engagement with a transverse bottom surface 101 of each of the recesses 91. Each flyweight member 97 also includes a rearward surface which is nearly co-planar with the rearward surface 89 of the housing member 83. Each flyweight member 97 defines a central spring chamber 105, the chamber 105 defining a central axis A1 which is substantially coincidental with the axis A defined by the recess 91.

Figure 4:
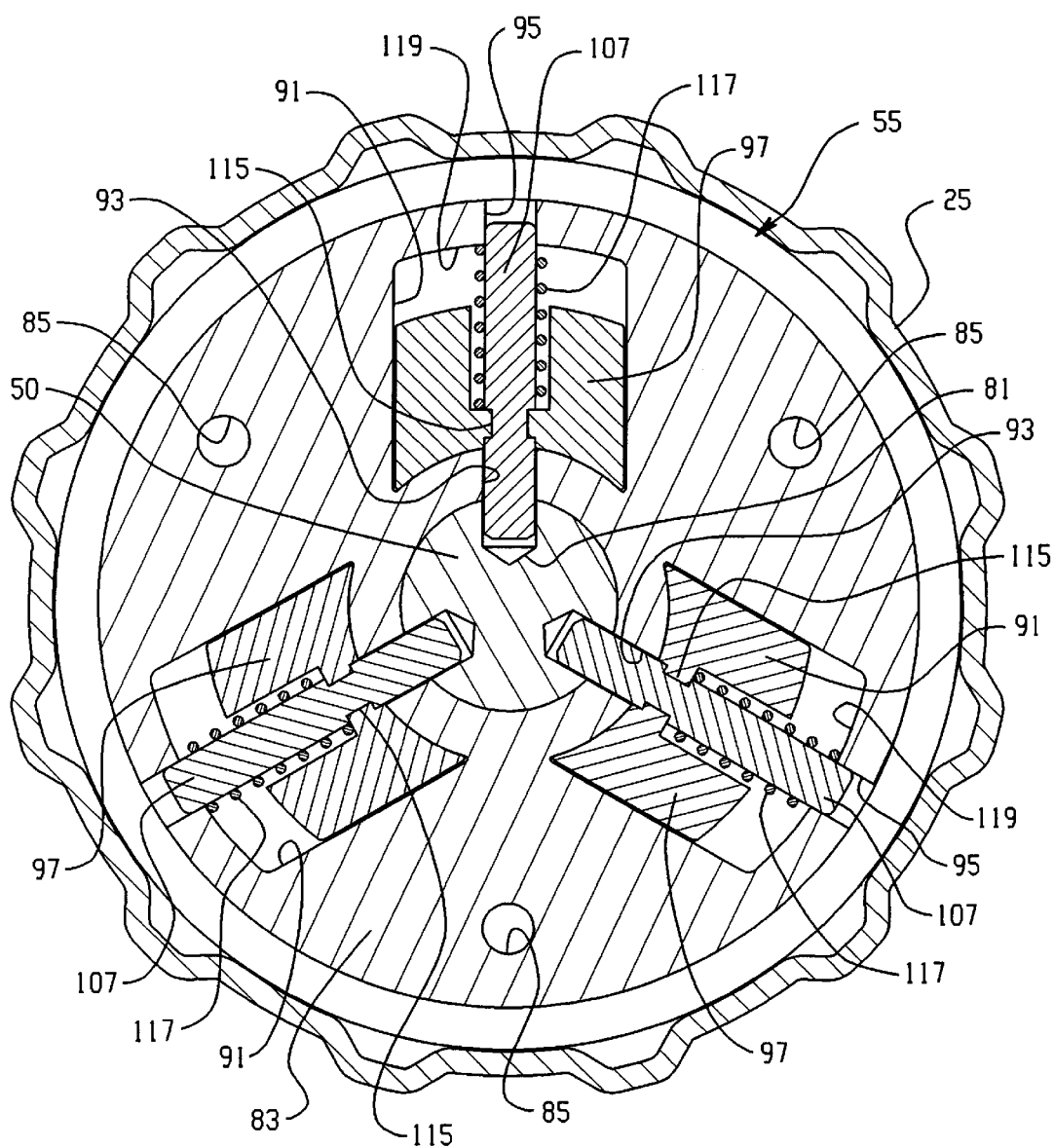
FIG. 4 is a transverse cross-section taken along line 4—4 of FIG. 2, and on approximately the same scale as FIG. 2.
Figure 7:
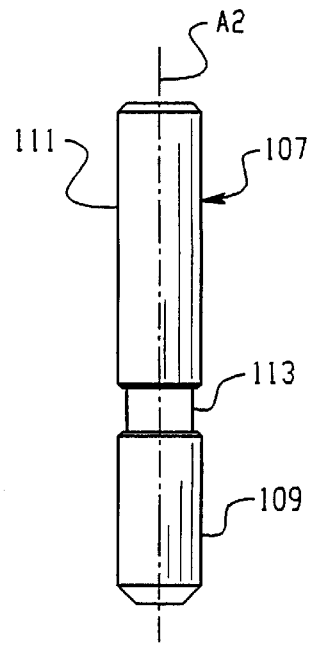
FIG. 7 is a plan view of one of the engagement members of the override mechanism of the present invention.

As may best be seen in FIGS. 4 and 7, the override mechanism 55 also includes a plurality of elongated engagement members (pins) 107, each of which defines an axis A2 which is also coincidental with the axes A and A1. Thus, the engagement member 107 is centrally disposed within the spring chamber 105 and includes an inner portion 109 which is disposed within the radially inner bore 93, and also defines an outer portion 111 which is disposed within the radially outer bore 95. The portions 109 and 111 of the engagement member 107 are separated by a reduced diameter portion 113 which is engaged by a generally U-shaped opening 115 formed in the flyweight member 97, and disposed radially inward from the spring chamber 105. Thus, once the override mechanism 55 is assembled, each flyweight member 97 is in engagement with its respective engagement member 107, such that the members 97 and 107 move in unison within the recess 91.

Disposed between each engagement member 107 and the spring chamber 105 is a helical compression spring 117, shown only in FIG. 4. The radially outer end of each spring 117 is seated against an outer arcuate surface 119 defined by the recess 91, while the radially inner end of each spring 117 is seated against the surface, defined by the flyweight member 97, adjacent the opening 115. The biasing force of the springs 117 is selected such that, at relatively low vehicle speeds, for example, below about 20 to about 25 mph., the engagement members 107 are biased radially inward to the position shown in FIG. 4, in which the shaft portion 49 is effectively connected to the first ramp plate 51, through the engagement of the pins 107 within the bores 81. Thus, at such relatively low speeds, a positive torque can be transmitted from the input shaft 15, through the viscous coupling 29, and through the ball ramp actuator 31 and clutch pack 33 to the output shaft 19. It should be noted that such positive torque is transmitted with the vehicle in either forward or reverse gear, although, as was described previously, it is only when the vehicle is in reverse gear that there is the need to transmit torque through the override mechanism. As was also explained previously, with the vehicle in reverse gear, positive torque cannot be transmitted in the normal manner because of the one-way clutch 57.

As the vehicle speed increases, the flyweight members 97 begin to move radially outward, in opposition to the biasing force of the springs 117, until the pins 107 are removed from the openings 81, thus "disconnecting" the shaft portion 49 from the first ramp plate 51, so that, above the predetermined speed, only positive torque can be transmitted, whereas negative torque can not be transmitted.

It is a significant feature of the present invention that the one-way clutch 57 and the override mechanism 55 are disposed in series between the output of the viscous coupling 29 and the input to the ball ramp actuator. Thus, it is necessary for the clutch 57 and the mechanism 55 to be designed to transmit only the relatively low level of torque which is transmitted from the viscous coupling to the ball ramp actuator, rather than the relatively high level of torque which is transmitted from the clutch pack 33 to the output shaft 19.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A differential device of the type including an input adapted to receive input torque from a source of torque, an output adapted to provide driving torque to an output device, and a clutch pack including at least a first friction disc fixed to rotate with said input, and at least a second friction disc fixed to rotate with said output; means operable to move said friction discs between a disengaged position and an engaged position, and comprising a cam ramp actuator including first and second ramp plates, and a plurality of cam members, each operably disposed between said first and second ramp plates; said second ramp plate being disposed axially adjacent said friction discs and being operable to move said friction discs toward said engaged position; said means operable to move said friction discs further comprising a viscous coupling including an input coupling member fixed to rotate with said input, and an output coupling assembly; characterized by:

(a) one-way clutch means disposed in series between said output coupling assembly and said first ramp plate; and (b) said one-way clutch means being configured such that positive torque is transmitted from said input through said viscous coupling, through said one-way clutch means to said first ramp plate during operation in a forward direction, whereas negative torques are not transmitted from through said one-way clutch means, during operation in said forward direction.

2. A differential device as claimed in claim 1, characterized by said output coupling assembly comprising an output coupling member and a viscous output shaft, fixed to rotate with said output coupling member and extending axially out of said viscous coupling, and including a rearward portion operably associated with said first ramp plate.

3. A differential device as claimed in claim 2, characterized by said one-way clutch means being mounted radially between said rearward portion of said viscous output shaft and an inner periphery of said first ramp plate.

4. A differential device as claimed in claim 3, characterized by said device further comprising an override mechanism operably associated with said output coupling assembly and said first ramp plate, said override mechanism being configured such that positive torque is transmitted from said input to said first ramp plate during operation in a reverse direction.

5. A differential device as claimed in claim 4, characterized by said override mechanism comprising a housing member fixed to rotate with one of said output coupling assembly and said first ramp plate, and further comprising at least one engagement member moveable relative to said housing member and operable to engage the other of said output coupling assembly and said first ramp plate.

6. A differential device as claimed in claim 5, characterized by said housing member of said override mechanism being fixed to rotate with said first ramp plate, and said engagement member comprising a member and means biasing said member toward engagement with said viscous output shaft.

7. A differential device as claimed in claim 4, characterized by said override mechanism further comprising speed sensitive means operable to prevent the transmission of positive torque from said input to said first ramp plate, during operation in said reverse direction, above a predetermined speed of rotation.

8. A differential device as claimed in claim 6, characterized by said override mechanism further comprising a flyweight member operably associated with said housing member of said override mechanism and with said engagement member whereby, above a predetermined speed of rotation, said flyweight member moves said engagement member out of engagement with said viscous output shaft.

* * * * *